April 25, 1933.  A. E. BOTSFORD  1,905,892
SEEDING IMPLEMENT
Filed March 11, 1930    4 Sheets-Sheet 1
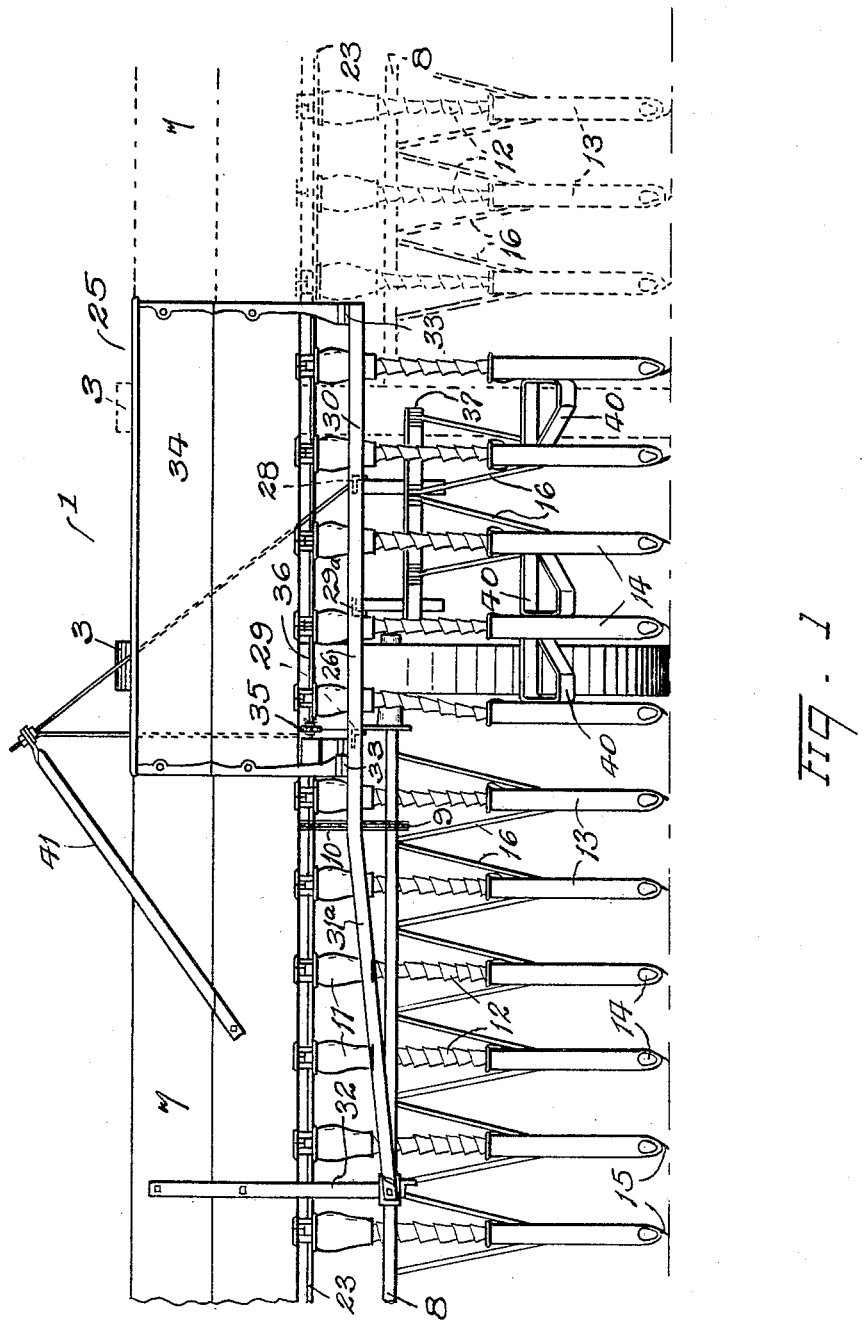
INVENTOR
BY *Albert E. Botsford*
ATTORNEY April 25, 1933.  A. E. BOTSFORD  1,905,892
SEEDING IMPLEMENT
Filed March 11, 1930  4 Sheets-Sheet 2
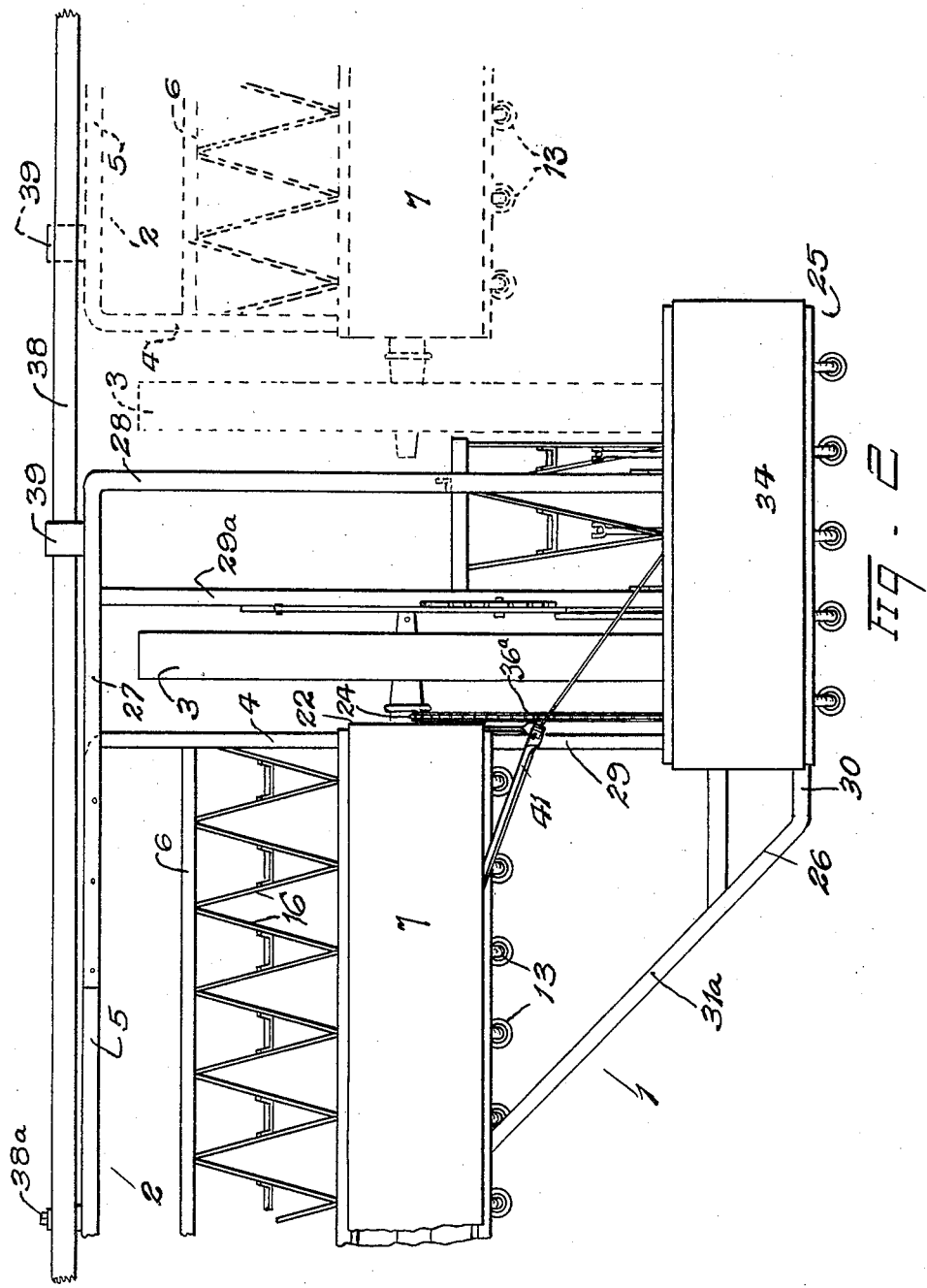
INVENTOR
BY  Albert E. Botsford
ATTORNEY April 25, 1933.  A. E. BOTSFORD  1,905,892
SEEDING IMPLEMENT
Filed March 11, 1930  4 Sheets-Sheet 3
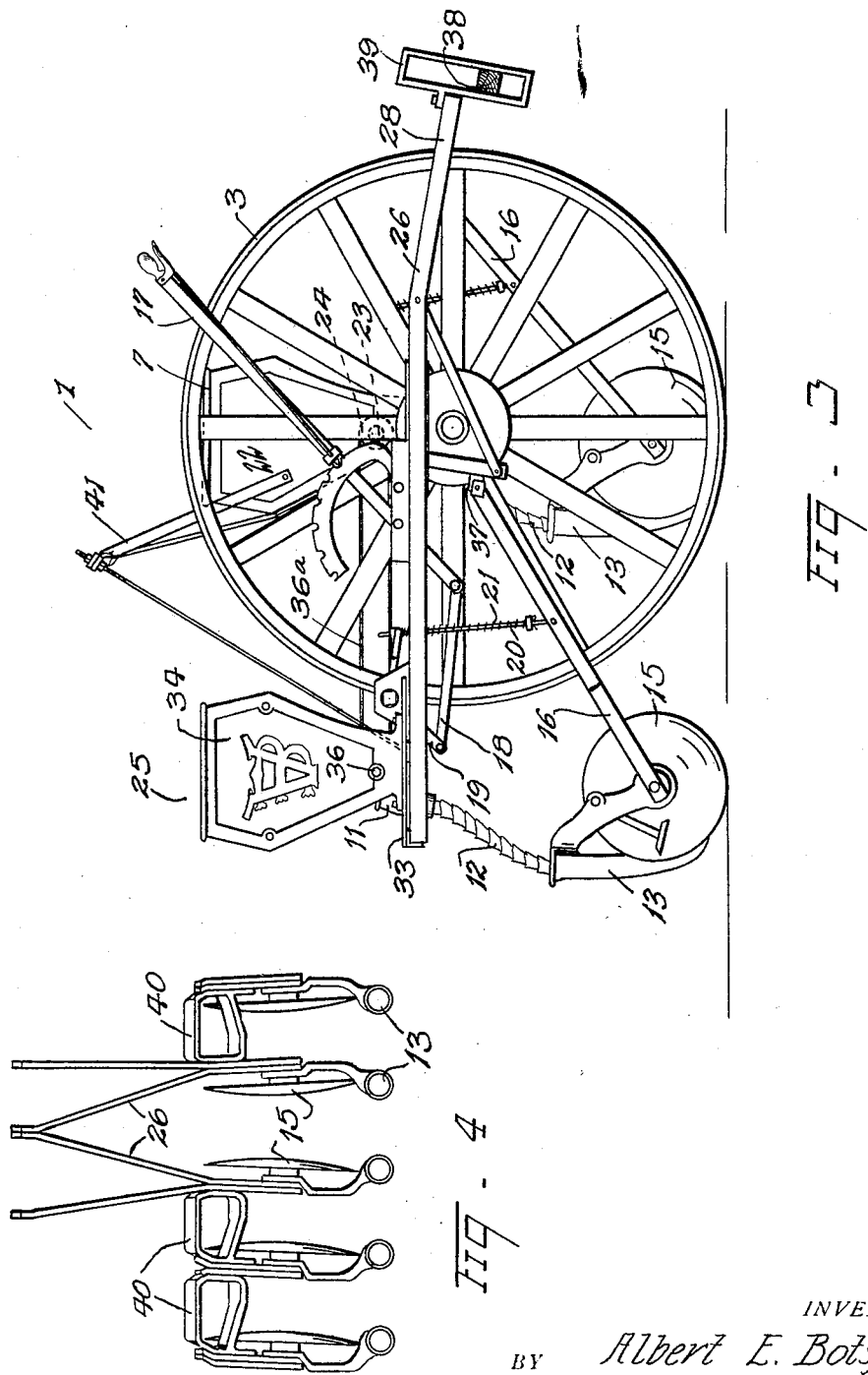
INVENTOR
BY  Albert E. Botsford
  ATTORNEY

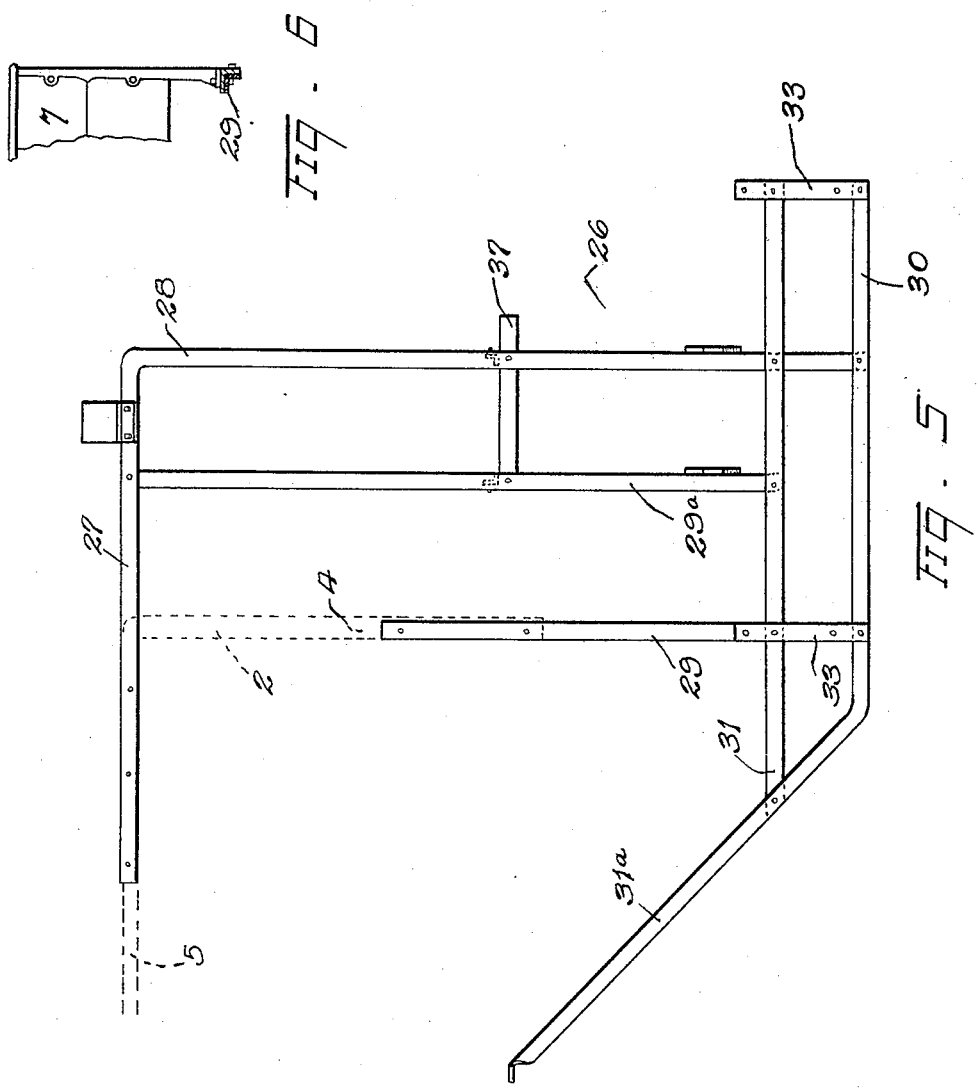

Patented Apr. 25, 1933

1,905,892

UNITED STATES PATENT OFFICE

ALBERT E. BOTSFORD, OF WALLA WALLA, WASHINGTON

SEEDING IMPLEMENT

Application filed March 11, 1930. Serial No. 434,955.

This invention relates to seeding implements of the nature of grain drills, and has as one of its objects to provide a grain drill having means to deposit seed in lateral continuation and in the path of the driving wheels without interference therefrom.

Another object of the invention is to provide a grain drill that when coupled in lateral series with other drills and to a common draft source, will deposit the seed in a continuous swath without skips due to any lateral divergence between any two of the units of the series.

A further object of the invention is to provide a grain drill that carries a seed depositing extension positioned to operate in staggered relation with any unit operating adjacent to said extension.

A further object of the invention is to provide a grain drill having a seed depositing extension, rigidly attached to and carried by the frame of the main drill, and operably connected therewith for concerted action.

A further object of the invention is to provide a grain drill having a suspended seeding extension that by suitable construction of the extension will deposit the seed to a point beyond the end of the original drill.

A further object of the invention is to provide a grain drill having a seed depositing extension, formed integral and operable therewith to form a seeding unit, and to permit lateral coupling in spaced relation to each other, of a multiplicity of units to a common draft source, and providing for the free and independent movement of each unit in a vertical plane and the concerted movement of the units.

A further object of the invention is to provide a grain drill that will deposit seed up to and directly against a fence, ravine or other obstacle which does not permit the wheel of an ordinary drill to approach closely thereto.

A further object of the invention is to provide a means for increasing the capacity of any grain drill when attached thereto, without materially increasing the weight or draft of the original drill.

A further object of the invention is to provide a grain seeding device which when used in series abreast on hill sides, will permit the units thereof to slide concertedly without damage and without causing skips or overlaps.

A further object of the invention is to provide a grain seeding device which by lateral connection in series abreast, and to a common draft source, will eliminate undue strain on the draft means, which strain is experienced when the units are drawn at different distances from the draft bar.

With these and other objects in view, reference is now had to the accompanying drawings in which, Fig. 1 is a rear elevation of the device showing its application;

Fig. 2 is a plan view thereof;

Fig. 3 is an end elevation thereof;

Fig. 4 is a plan view of the seed depositing members, showing the method of spacing and attachment;

Fig. 5 is a plan view of the auxiliary frame, and

Fig. 6 is a rear elevation of a fragment of the main hopper showing the method of connecting the frame thereto.

Having reference to the drawings like numerals refer to like parts throughout the several views, and the numeral 1 refers to a seeding implement, which implement will be termed a drill as the specifications proceed, and is intended to represent any seeding mechanism that may be adapted for extension, within the scope of the claims.

While the seeding mechanism herein described will provide rows of seed implanted in the ground, or, within the scope just mentioned, other methods of planting may be employed according to the machine used, and the reference to additional rows in the specifications and claims will have reference to an added capacity of the implement.

With the above in mind, the drill shown herein consists of a frame 2, preferably a vehicle frame provided on each end with wheels 3, one only of which is shown, and which wheels are intended to support the drill and by their traction to operate the feeding mechanism of the drill, which feeding mechanism is not shown as it is old in the art and is not intended to constitute the invention herein claimed. The frame consists of forwardly extending members 4 which are united at their front ends by a cross piece 5 extending laterally from end to end of the drill with a second cross member 6 positioned back of the front member and extended parallel thereto, and secured to the forwardly extending members to provide a brace member and also to accommodate other members to be described.

Mounted on the frame is a hopper 7 which contains the feeding mechanism mentioned, which mechanism is operated from the axle 8 of the wheels upon which is mounted a sprocket wheel 9 from which a chain 10 extends upwardly to engage and operate the feeding mechanism.

This operating means, while being shown as a sprocket and chain, is intended to represent a variable speed mechanism whereby changes in the velocity of the feeding mechanism may be had, and this portrayal is merely used in a typical sense as it is likewise old in the art in which it is well known.

By this means, the traction of the wheels will operate the feeding mechanism at the required speed as the drill moves along the ground, and the hopper will contain the seed grain, which, as the feeding mechanism operates, will pass to the ground through the feeding cups 11, thence through the flexible tubes 12 and into the hoes 13, which hoes are provided with openings 14 at their lower ends whereby the seed escapes to enter a furrow in the ground which has been prepared by a disc 15 positioned ahead of each hoe for the purpose by the point of the hoe itself, or other approved furrow openers providing a yielding planting mechanism.

These hoes are maintained in their respective positions by means of Y members 16 which members are extended forwardly and are hinged to the cross brace member 6 above mentioned, and are provided with means whereby each hoe may be raised or lowered on its pivotal connection whenever necessity demands. Such an operating means is shown in Fig. 3 as applied to the offset extension (which extension will be termed a seed depositing extension) and which operating means consists of an operating lever 17 suitably fulcrumed on the frame of the machine and provided on its lower end with a rearwardly extending connecting rod 18 which is connected with a bell crank mounted in suitable supports attached to the frame, the other end of which crank being connected to and yieldingly supported by a vertically positioned rod 20 which, depending, is connected with the Y braces whereby, by the movement of said operating lever, the hoes may be raised to pass over obstacles while a spring 21 mounted on this said rod will be arranged thereon to yieldingly permit automatic action should any individual hoe or its disc come in contact with an obstruction.

As a fragment, only, of the drill is shown, the position of the discs at each end of the drill is not shown except in the view shown in Fig. 4, which view illustrates the fact that the discs are positioned in opposite form whereby, in the large machines, the tendency to side draft will be equalized, which equalization will be more fully described as the specifications proceed.

The hopper 7 is likewise laterally positioned on the frame so that its end plate 22 will be several inches from the driving wheel and which positioning therefore provides a space therebetween that enables the shaft 23 that drives the feeding mechanism to protrude through the end plate of the hopper and to receive thereon a sprocket wheel 24, or other driving means, the purpose of which will be presently explained.

To accomplish the objects set forth it is necessary that provisions be made to plant the seed behind the wheel of the above described drill (which drill will be termed the parent drill, it supporting the extension or auxiliary drill) and sow additional rows beyond the rows of said drill, and for this purpose the seeding extension 25 is provided, which extension consists of a frame 26 having a forward member 27 adapted for rigid securement to the forward member 5 of the parent drill frame, and this frame 26 which will be termed an auxiliary frame has its forward member bent to provide a rearwardly extended outer carrying member 28, while an inner carrying member 29 is secured to the main frame as shown in Fig. 6 and is likewise extended rearwardly and these two carrying members support an auxiliary platform consisting of two parallel members 30 and 31 respectively positioned perpendicular to the carrying members 28 and 29 with the rearmost member 30 having an extended portion 31a bent to return to the main drill and be secured to the axle supporting brace 32 as shown in Fig. 1 whereby to brace this platform and maintain it rigid with respect to the main drill.

It will be noted by referring to Fig. 5 that further bracing occurs as the member 31 is extended to connect with the said bracing member and a central longitudinal member 29a connects this member 31 with the front member 27 of the auxiliary frame by which assemblage and connection of parts the auxiliary platform is suspended by cantilever action to be supported indirectly by the drive wheel which is enclosed in this said framework without outward support, and at either end of the parent drill.

Across the respective ends of this platform are plates 33 adapted to provide a level foundation upon which is secured a short hopper 34 or auxiliary drill constructed identical to the main hopper just described, except as to length, and this hopper contains a similar feeding mechanism together with the hoes 13 and other accessories that go to make up a shortened unit adapted for the same purpose of seeding.

The hoes of this hopper are spaced equally with the hoes of the parent drill, and are disposed in a manner to form a continuation of the series of parent drill hoes, the combination forming an extended series having equal spaces between each and every hoe, whereby the work will be uniform from the extreme end of the main drill to the opposite extreme end of the extension.

As the feeding mechanism of this auxiliary hopper is identical with that of the main hopper, a sprocket wheel 35, mounted on the drive shaft 36 of the feeding mechanism of this hopper may be readily connected by a chain 36a, or other means, with the aforementioned sprocket 24 added to the drive shaft of the feeding mechanism of the main hopper, whereby it now becomes obvious that the feeding movements of both hoppers are synchronized for identical operation, and that were a change of speed made in the main hopper in the usual manner, an identical change would occur in the auxiliary hopper. Sowing therefore would be uniform throughout the entire length of the drill and its extension, and the spacing of the rows would be maintained in true parallel relation in lateral continuation of the main drill and the track made by the drive wheel would not affect the sowing, regardless of its position laterally, as the hoe following in the wheel track (should the wheel be directly ahead of the hoe) would be disturbed by the following hoe, thus providing for uniform germination and growth of the seed by the uniformity of the ground condition provided by this disturbance.

By this disposition of the seeding extension and by its suspension it is obvious that a drill may plant closer to a fence, ravine or the like, thereby providing greater acreage of the grain so planted.

It is also obvious that by this extension two or more drills may be combined in series laterally and the gaps occurring between the drills closed by this extension member, which while being integral with its parent drill, and forming therewith a complete implement, may be positioned in corresponding relation to the added drill with a result that, with sufficient draft power, as by a tractor, several complete drills may be drawn at the same time, with the rows uniformly spaced throughout their entire length, and when it is considered that the seeding extension is approximately one fourth of the length of its parent drill, four of these combinations will then produce the equivalent of five drills; while their expense may approximately equal the added drill, the power required would be reduced as would the upkeep, while the time of operation would be likewise reduced, and this in addition to the consequent reduction in labor expense together with a greater efficiency in performance, renders the device highly desirable.

Obviously the same bracing effect of the auxiliary frame with certain minor changes would permit the seeding extension to be placed ahead of its parent drill, however the position shown is my preferred form or arrangement.

The above arrangement now obviously provides an elongated drill having one of its driving wheels inset from an extended end thereof, thereby maintaining the original gauge, or spacing apart, of the driving wheels and at the same time providing an overhanging seed depositing portion of the drill adapted to function normally with the drill and also operate in otherwise inaccessible places.

By observing Fig. 2 it will be noted that it is necessary to maintain the lateral alignment and spacing of the main drills to prevent the wheel of the added drill from engaging the cross piece 37 extended perpendicular to the outer carrying member 28 and its parallel member 29a, which cross piece is similar to the second cross piece 6 of the parent member, which cross piece 37 on the auxiliary frame receives the Y braces 16 which maintain the hoes 13 in their proper position, and which will be presently explained.

To prevent this interference and to maintain the drills in proper spacing, an alignment means is provided of the nature of a draft bar 38 which consists of a laterally extending bar preferably pivotally attached to the front member 5 of the main frame, as at 38a, with a yoke 39 secured to the auxiliary frame through which the draft bar passes to provide for vertical flexibility of the adjacent drills and by this lateral coupling secure the drills against lateral divergence permitting a rocking movement on its pivot to each of the drills providing for independent flexibility but preventing independent movement laterally.

By reference to Fig. 4 and in view of Fig. 2, it will be noted in this Fig. 2 that the cross bar 37 must of necessity be spaced away from the main forwardly extending frame member of the parent drill due to the wheel hub and the like and the space required therefor, and a similar space of less expanse will occur opposite this member where drills are connected in series, and to compensate for this, spacer members 40 are provided as shown in Fig. 4, which spacer members maintain the respective hoes and discs to their true position, to be carried and braced by their respective Y braces whereby the continuity of the spacing of the rows may be truly maintained and the proper position and direction of the discs or other furrow openers maintained unaffected by the position of the drive wheels of the drills.

In use and where a single unit is to be employed, the hoppers may be provided with their supply of seed, their speed adjusted and movement over the ground for seeding purposes may then take place.

Moving over the ground with a single unit, should a washout be encountered, the suspended, outwardly unsupported seeding extension may follow directly over the edge of the washout without danger of a cave-in due to the otherwise close proximity of the wheel and which might result disastrously. Or in the case of fence rows or in corners, seeding may be accomplished directly into the corner or against the fence, and by the location of the seeding extension to the rear of its parent drill, the circle traveled will obviously bring the seeding closer to the corner, and make a more complete operation than were the extension placed forward which would limit the movement of the parent drill in that direction.

Where the drills are connected together in series the same movement with relation to washouts, fences, and the like, will occur on a proportionately larger scale, and in addition where hill sides are encountered and slippage is unavoidable, it is obvious that regardless of the amount of slippage down hill, that this slippage will be uniform throughout the length of the machine and therefore the spacing of the rows will remain true and skips wholly avoided.

To further strengthen the auxiliary frame any suitable form of bracing may be used, such a brace being shown in Figs. 1 and 3 of the form of a tripod 41.

Let it be understood that references to the discs or hoes in the preceding subject matter will have reference to any furrow opener or other seed depositing mechanism, and further that whether a plurality or multiplicity of units are assembled in series that the extension of each unit will cover each gap between the units, with the extension of the last unit projecting beyond the series.

Having thus described my invention, I claim:

1. In a seeding implement, the combination with a plurality of spaced parent drills, aligned and abreast, of seeding extensions attached to and operable with their respective parent drills, without outward support, and provided with cantilever auxiliary frames disposed to support and to position said extensions to cover the space between said drills, and means rockably associated with said drills to maintain the lateral alignment thereof and to permit flexiblility thereof.

2. In a seeding implement, the combination with a parent drill, having driving wheels, of a seeding extension, including an auxiliary hopper mounted on a frame secured to said drill, and operably connected therewith, and projected therefrom without outward support, and disposed and adapted to complete a gap between aligned drills, where a plurality of drills are employed, a draft means, and means carried by said frame and associated with said draft means to maintain the alignment of said drills and permit flexibility thereof.

3. In a seeding implement, a series of laterally aligned parent drills, a seeding extension having an unsupported end mounted on and operable by the respective parent drills, and projected laterally therefrom, and means associated with said drills and the extensions to maintain the alignment of said drills.

4. In a seeding implement, the combination with an independently operable parent drill including a frame, drive wheels supporting said frame, a hopper mounted on said frame, and a feeding mechanism contained in said hopper and operable by said drive wheels, of a seeding extension attached to said drill and comprising a cantilever auxiliary frame secured to and providing a laterally disposed outwardly unsupported elongation of the drill frame, an auxiliary platform formed integral with said auxiliary frame and disposed to project laterally beyond the drive wheel of said drill, and an auxiliary hopper carried by said auxiliary platform and containing a feeding mechanism disposed for operable connection with the feeding mechanism of said drill.

5. In a seeding implement, the combination with a multiplicity of independently operable and laterally aligned drills positioned abreast, said drills being spaced apart to prevent interference of their respective adjacent driving wheels, of an auxiliary frame, provided with a cantilever supported auxiliary platform, attached to each parent drill, and extended to overlay the end of the adjacent drill, without contact therewith, a seeding extension carried by said platform and operable by its respective parent drill, and means rockably associated with said drills and said auxiliary frame to maintain the lateral alignment of said drills and provide for a rocking movement of each drill individually in the line.

6. In a seeding implement, a parent drill consisting of a hopper, containing an operating mechanism, and mounted on a frame, a laterally extending cross brace member carried by the frame and disposed ahead of the hopper, a driving wheel attached to each end of said frame and operably connected with said operating mechanism, a seeding mechanism carried by said hopper hingedly secured to said cross brace member, by means of Y members, an auxiliary frame disposed about one of said drive wheels, and provided with a central longitudinal member, and having laterally extended members rigidly secured to the parent drill, and a cross piece rigidly secured to said central longitudinal member and to said auxiliary frame, parallel members forming a part of said auxiliary frame, and extended laterally beyond said frame and providing a cantilever auxiliary platform supported by said parent drill, and an auxiliary drill mounted on said auxiliary platform and operably connected with the parent drill, and having its respective Y members hingedly attached to said cross piece.

7. In a seeding implement, a parent drill consisting of a hopper containing an operating mechanism and mounted on a frame, a laterally extending cross brace member rigidly attached to said frame and disposed ahead of said hopper, driving wheels attached to said frame, and operably connected with said operating mechanism, yieldingly mounted furrow openers supported by said frame, Y members associated with said furrow openers and hingedly attached to said cross brace member, to permit yielding movement in a vertical plane of said furrow openers, an auxiliary frame disposed about one of said driving wheels, and provided with laterally extended members rigidly secured to the parent drill and provided with a cross piece rigidly secured to said auxiliary frame, and a hopper forming a seeding extension to said parent drill, supported by said auxiliary frame, and operably connected with said parent drill, and provided with like furrow openers, said furrow openers being hingedly attached to said cross piece through the medium of their respective Y members.

8. A seeding implement, said seeding implement comprising a drill consisting of a parent drill and an auxiliary drill formed integral therewith, and provided with a pair of driving wheels adapted to support and operate said implement, and arranged with one of said wheels inset from the end of said implement and disposed to provide an overhanging and outwardly unsupported seed depositing extension.

In testimony whereof I have affixed my signature.

ALBERT E. BOTSFORD.